(12) United States Patent
Miyata

(10) Patent No.: US 7,525,290 B2
(45) Date of Patent: Apr. 28, 2009

(54) CHARGE CONTROL DEVICE FOR EXECUTING A PLURALITY OF CHARGE STAGES

(75) Inventor: Shouichirou Miyata, Iwata (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 147 days.

(21) Appl. No.: 11/753,410

(22) Filed: May 24, 2007

(65) Prior Publication Data

US 2007/0278991 A1    Dec. 6, 2007

(30) Foreign Application Priority Data

May 24, 2006   (JP) .............................. 2006-144051

(51) Int. Cl.
*H02J 7/00*   (2006.01)
*H02J 7/04*   (2006.01)
*H02J 7/06*   (2006.01)

(52) U.S. Cl. ...................... 320/160; 320/150; 320/152; 320/155; 320/157; 320/158

(58) Field of Classification Search ................. 320/125, 320/150, 152, 155, 157, 158, 160, 162, 163
See application file for complete search history.

(56) References Cited

FOREIGN PATENT DOCUMENTS

| JP | 2001-128385 | 5/2001 |
|---|---|---|
| JP | 2006-114312 | 4/2006 |

*Primary Examiner*—Akm E Ullah
*Assistant Examiner*—Richard V Muralidar
(74) *Attorney, Agent, or Firm*—Knobbe, Martens, Olson & Bear, LLP

(57) ABSTRACT

A battery is charged in a number of states, with a change from a third charge stage to a fourth charge stage (e.g., final stage) is executed when a battery voltage reaches a change voltage or when a charge time reaches an upper time limit, in order to inhibit the overcharging or undercharging of the battery. The upper time limit is set in response to a battery temperature detected at the end of a second charge stage. In addition, if the charge stage is changed to the fourth stage in response to a determination of whether the upper time limit has elapsed or not, a complete charge mode cycle is increased. At the fourth stage, a charge time calculated using a charge electricity quantity, a battery temperature and a charge mode of the first stage is set.

19 Claims, 17 Drawing Sheets

[FIG. 1]
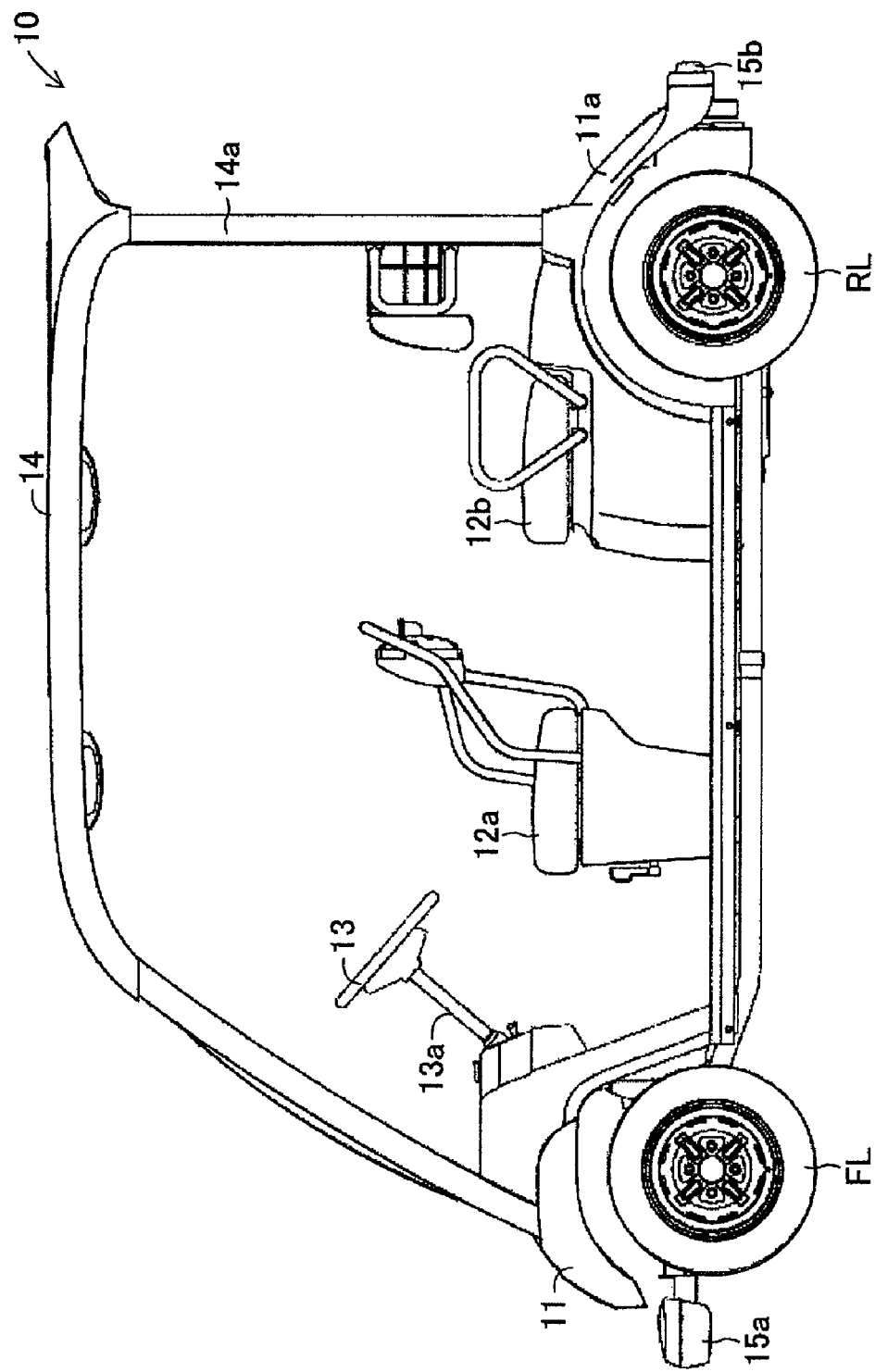

[FIG. 2]
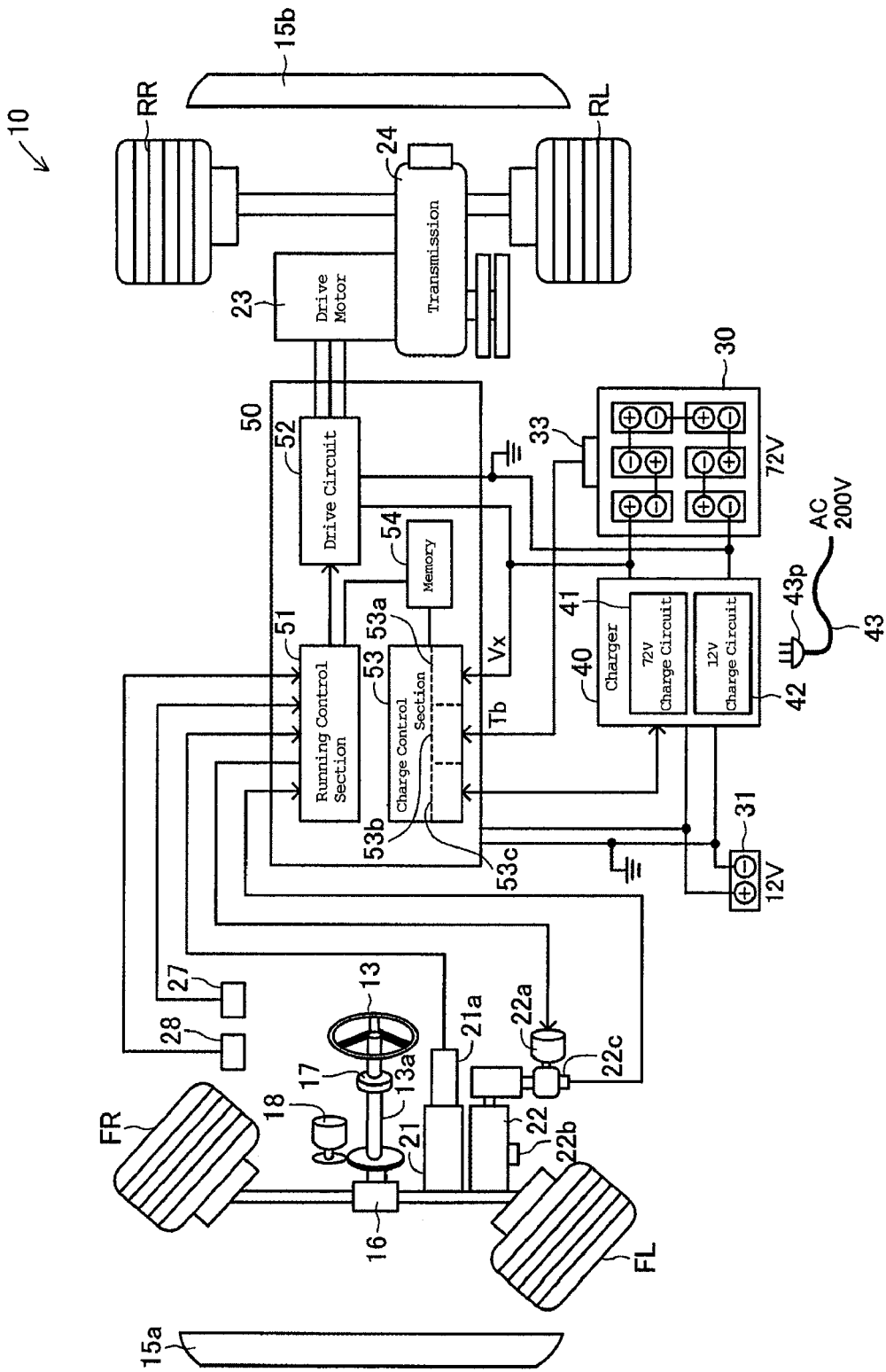

[FIG. 3]
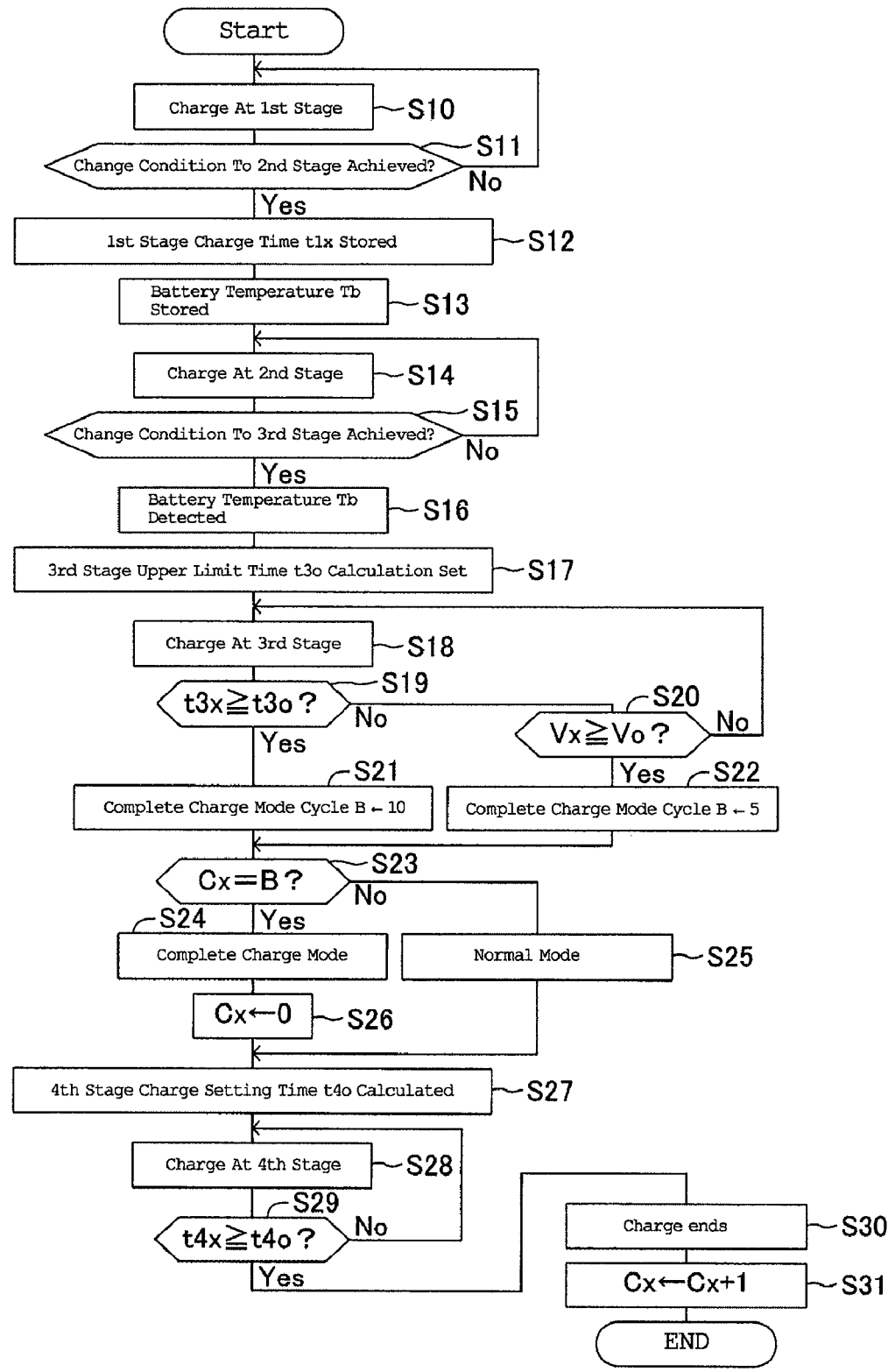

[FIG. 4]
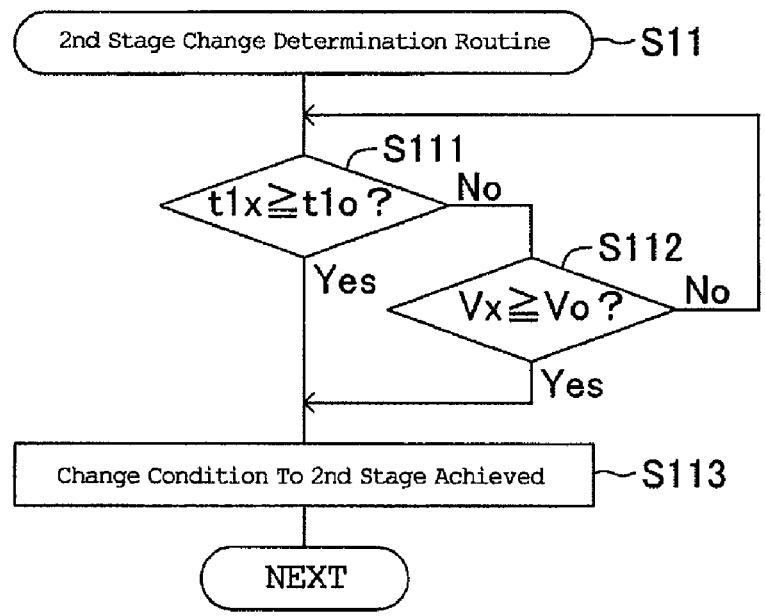

[FIG. 5]
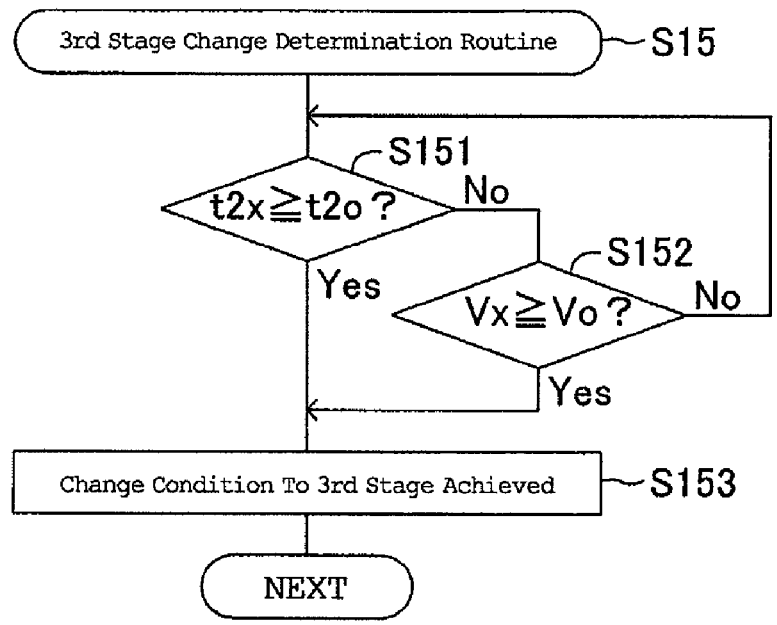

[FIG. 6]
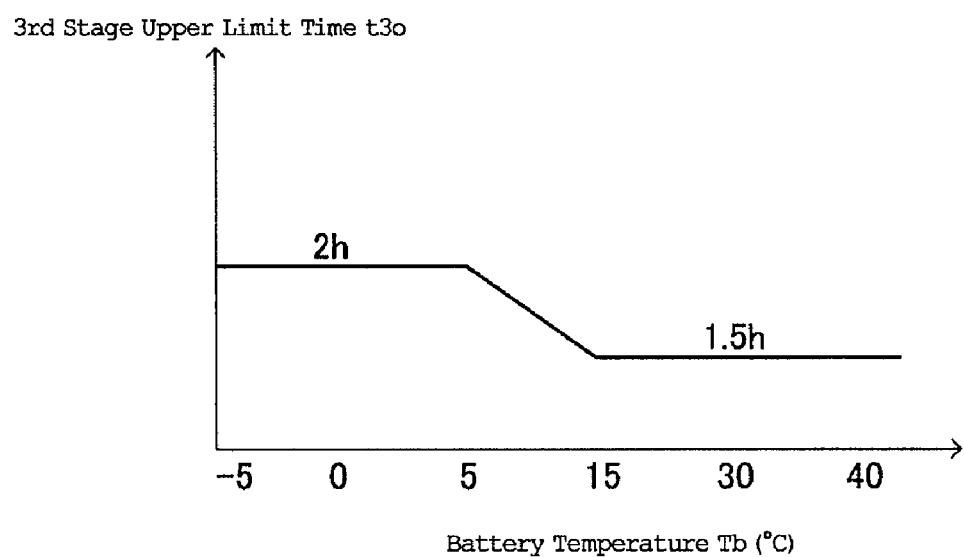

[FIG. 7]
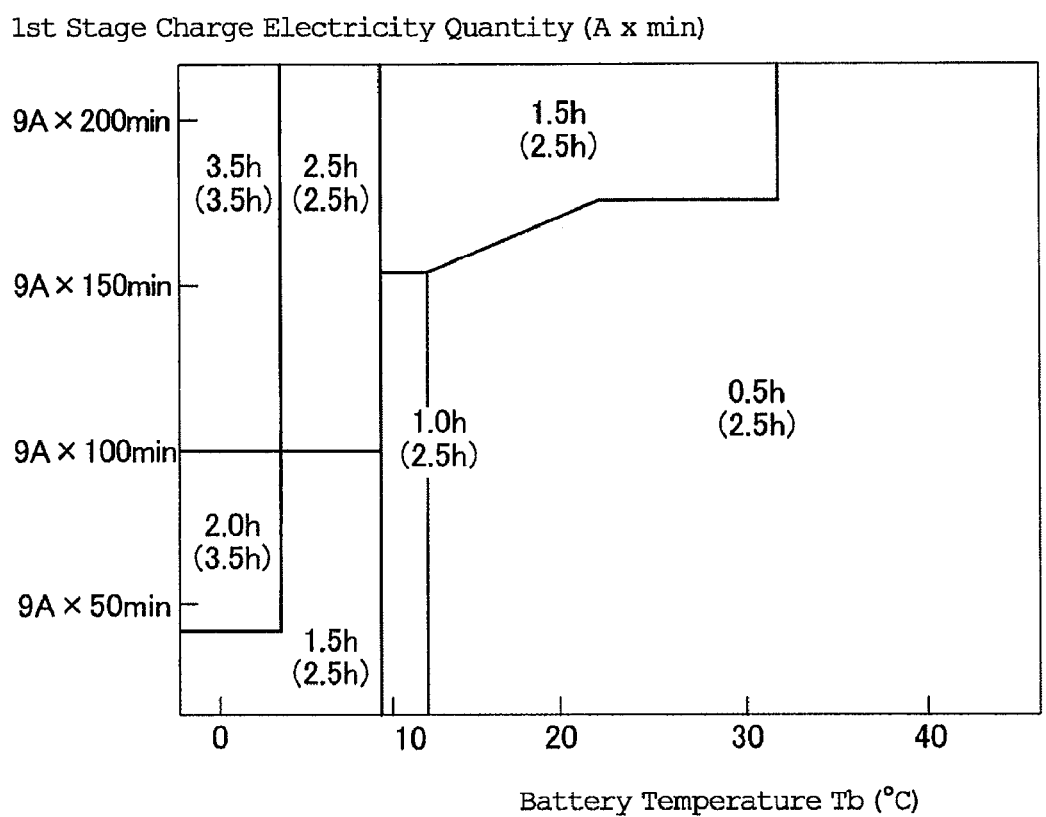

[FIG. 8]
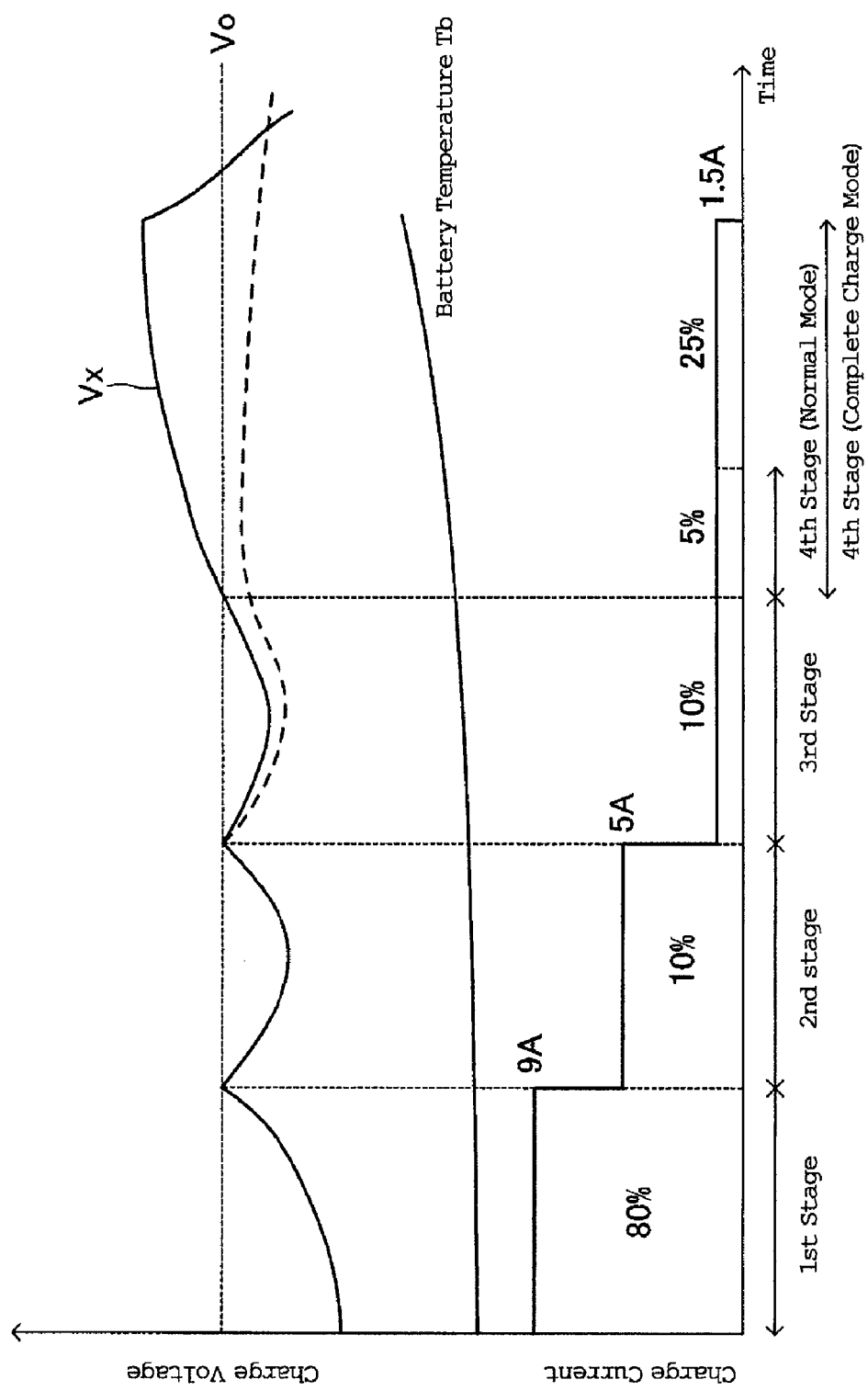

[FIG. 9]
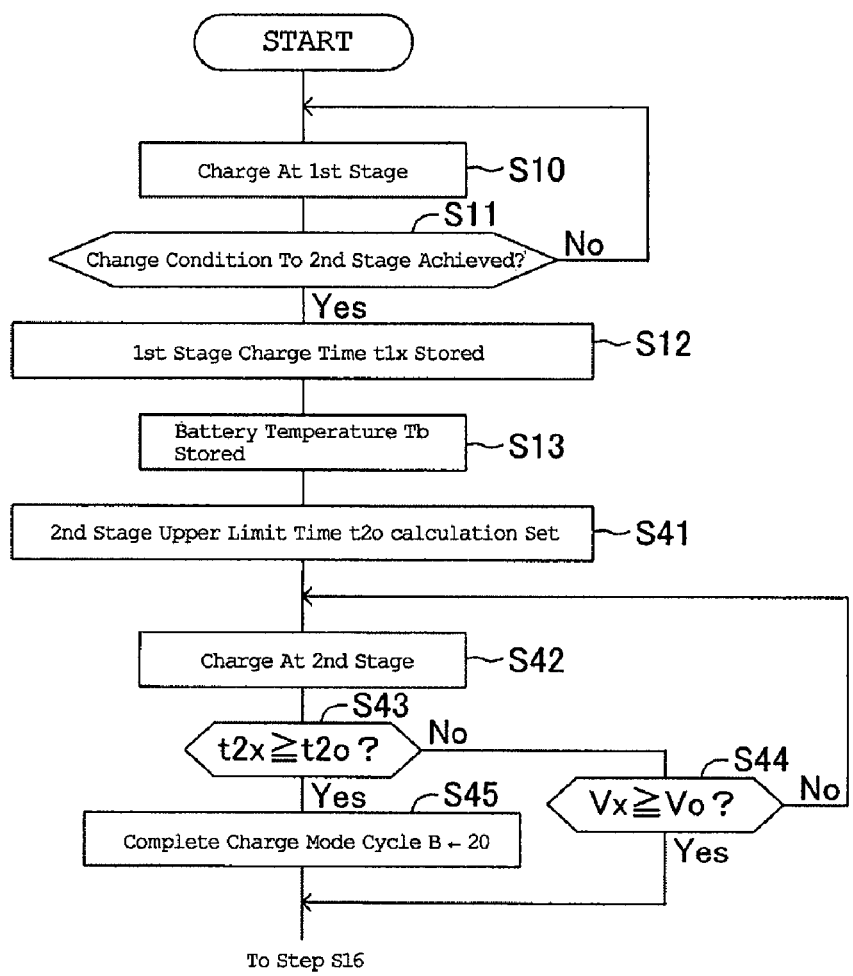

[FIG. 10]
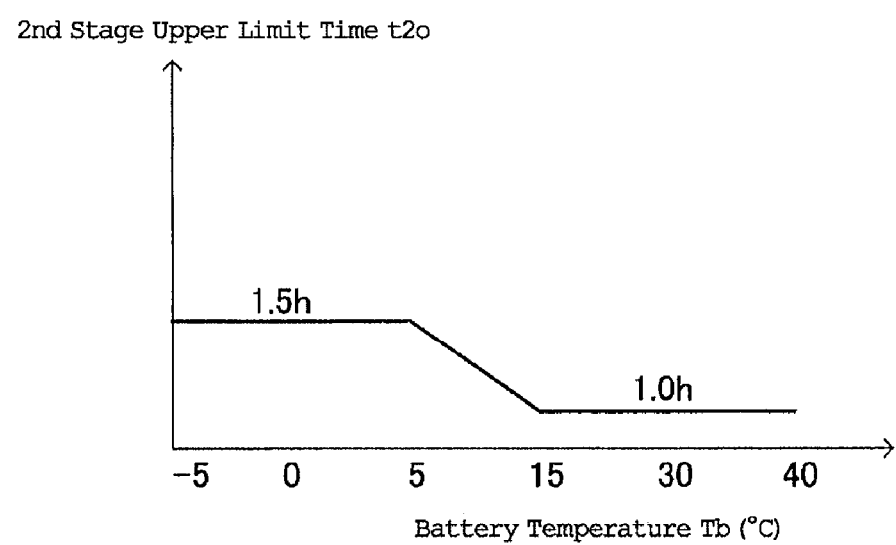

[FIG. 11]
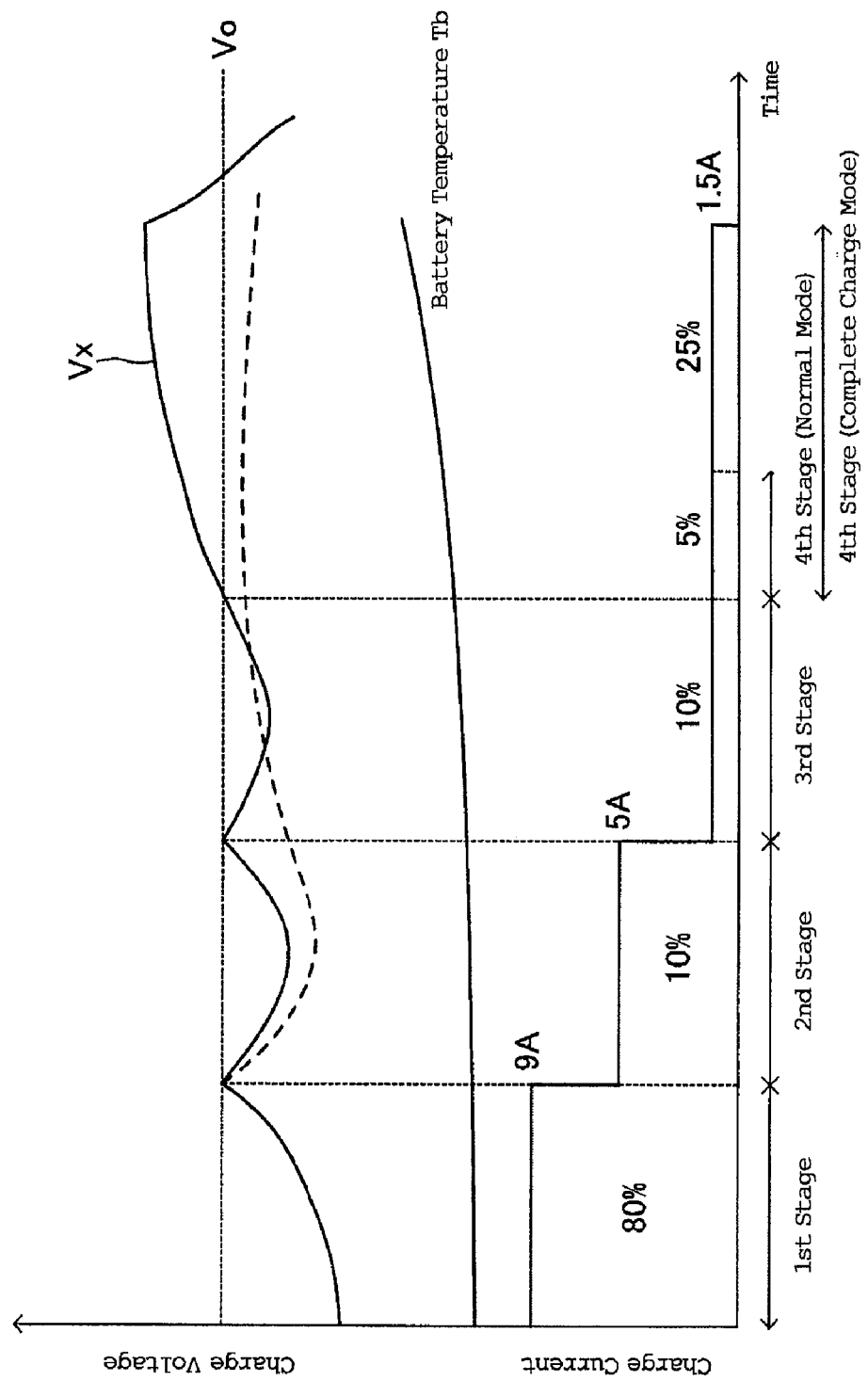

[FIG. 12]
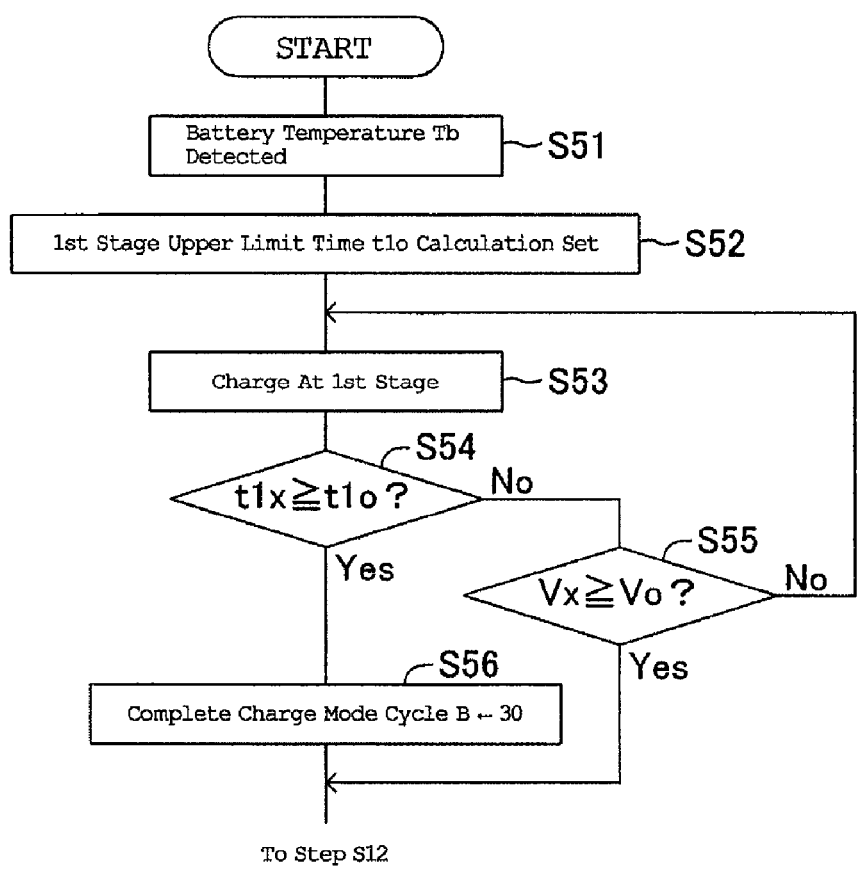

[FIG. 13]
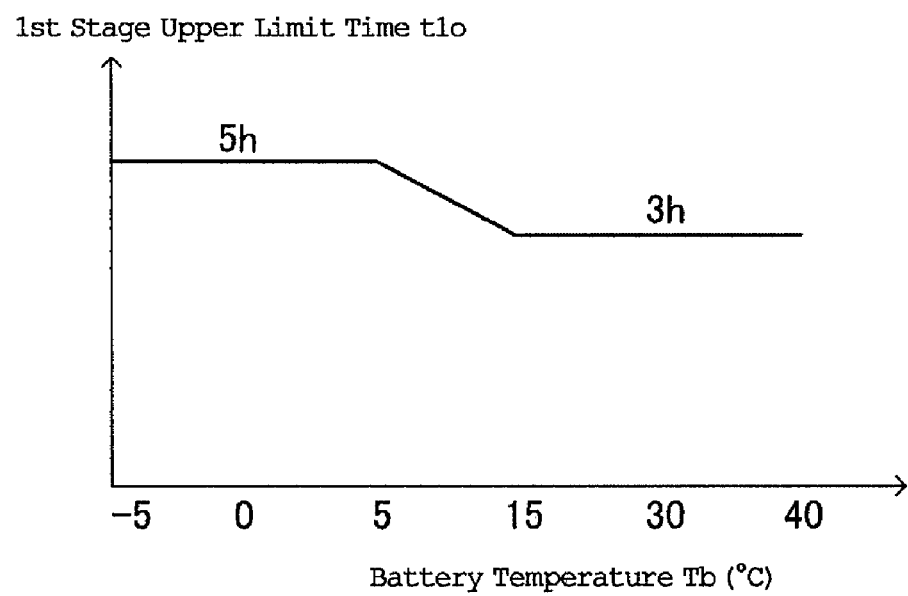

[FIG. 14]
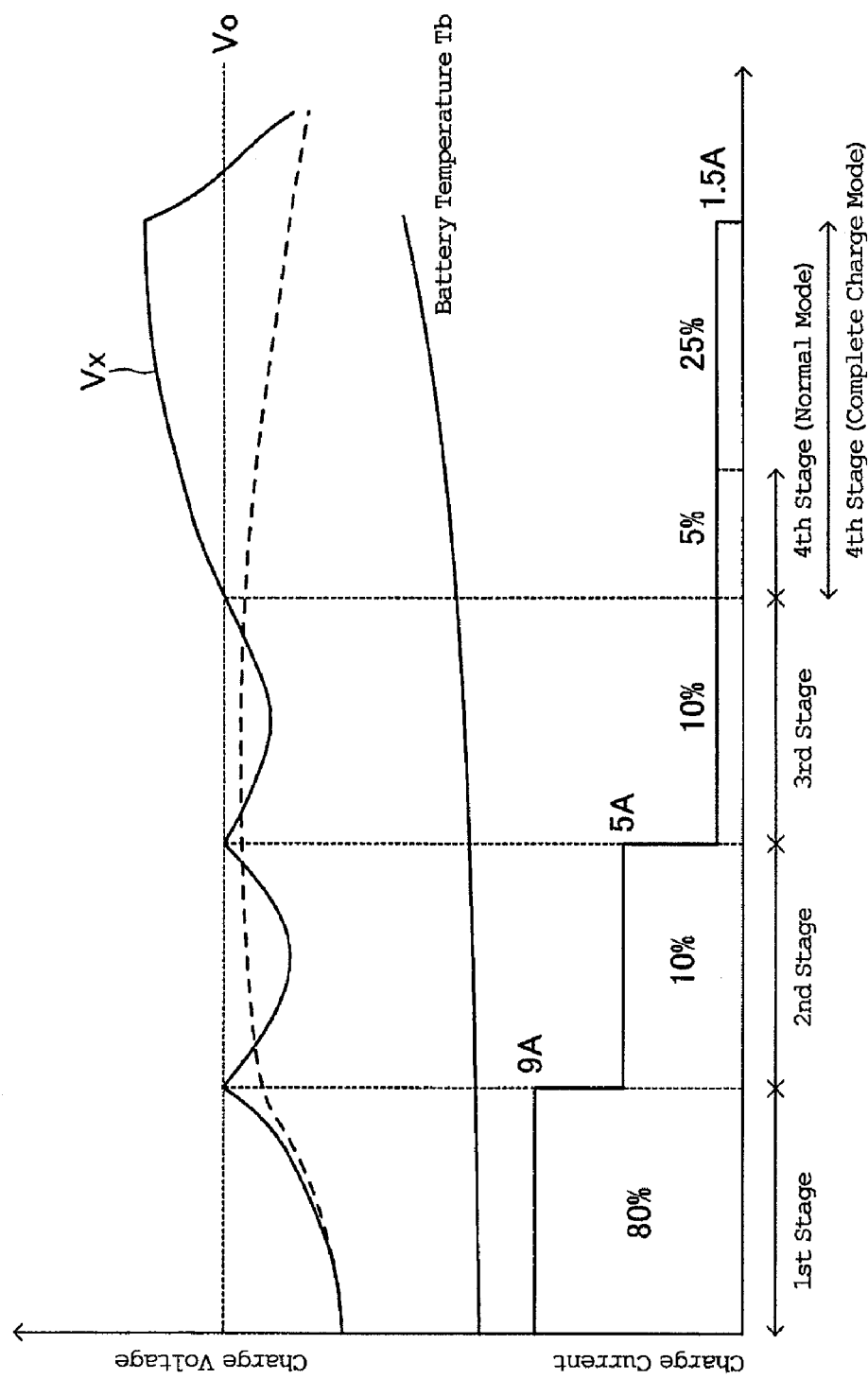

[FIG. 15]
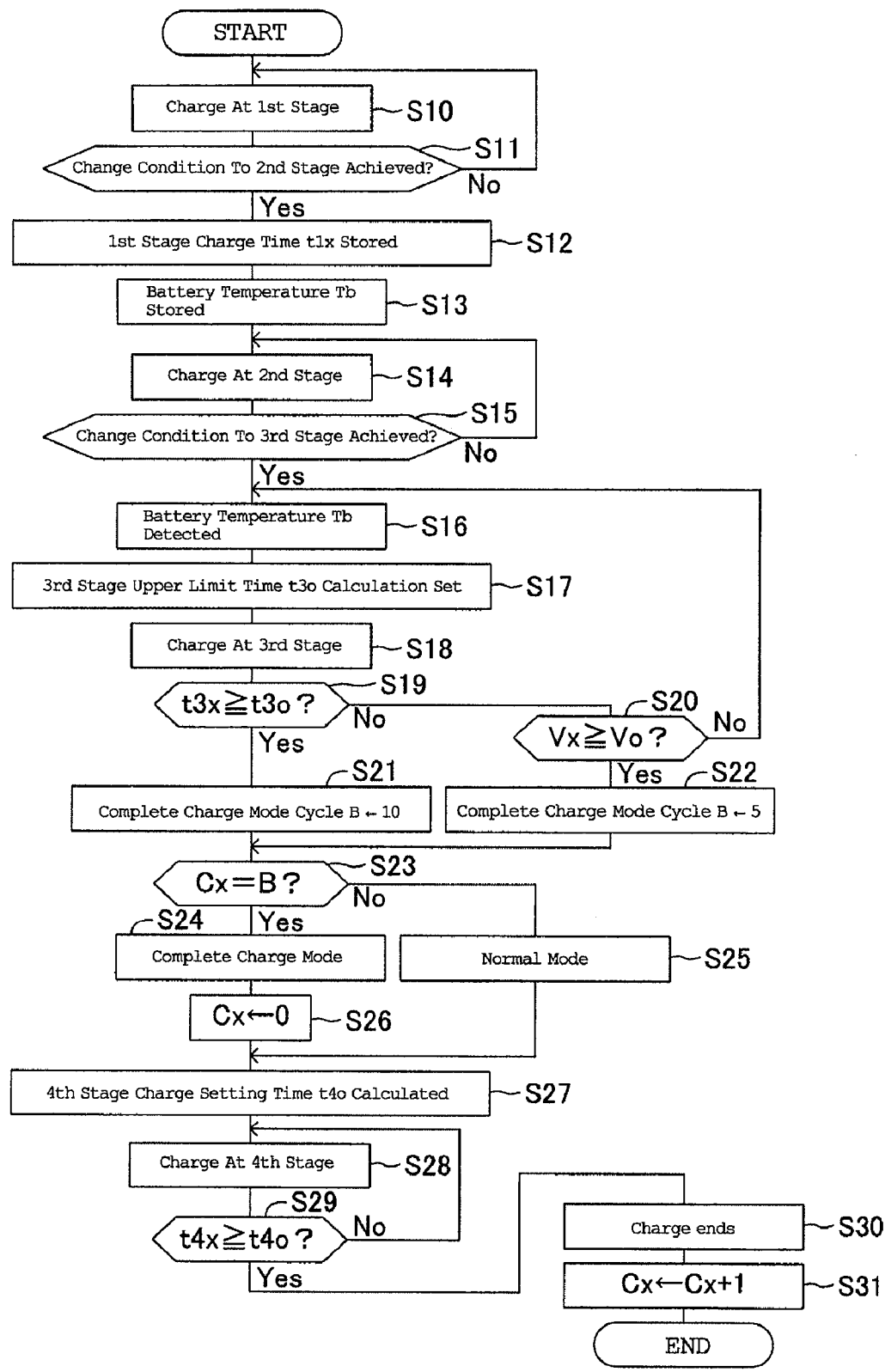

[FIG. 16]
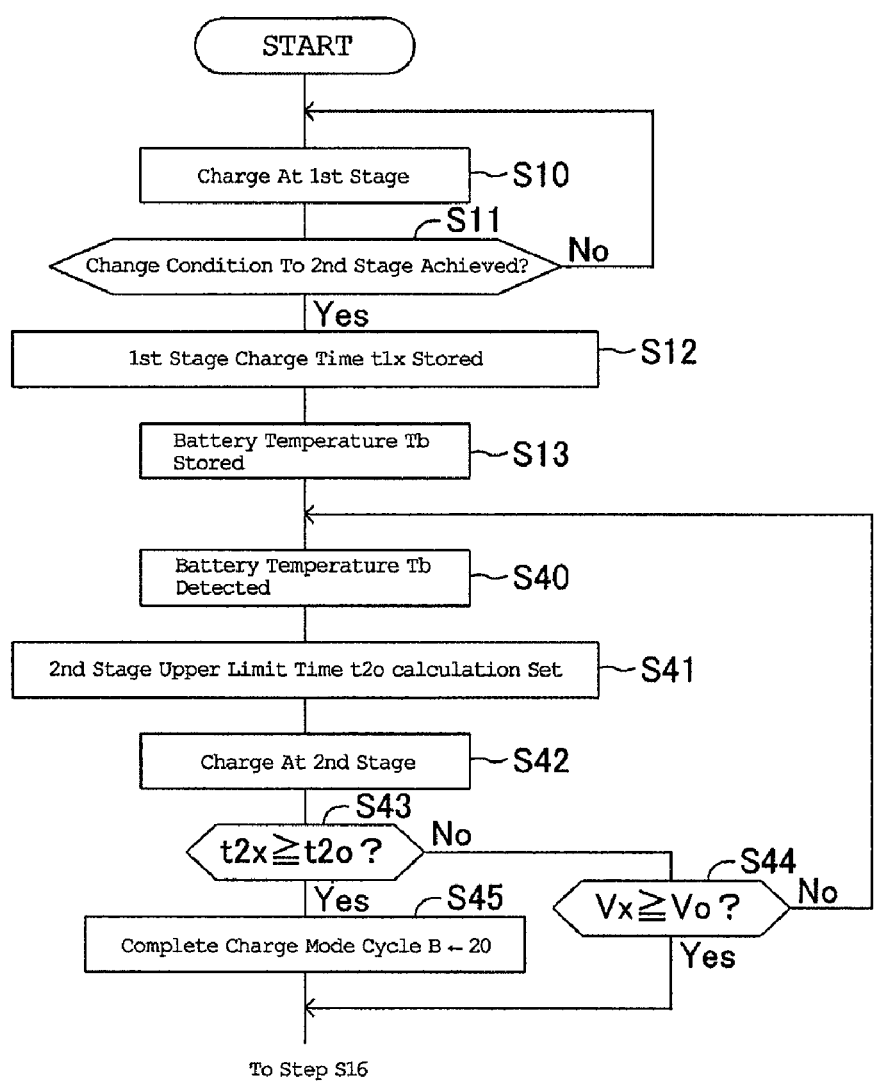

[FIG. 17]
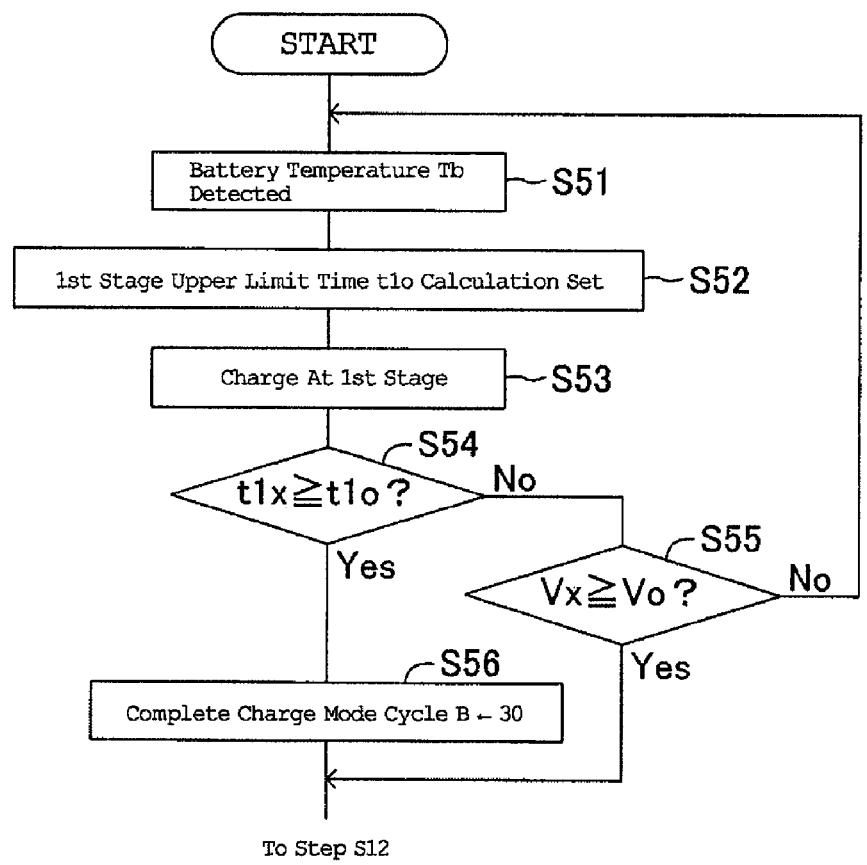

CHARGE CONTROL DEVICE FOR EXECUTING A PLURALITY OF CHARGE STAGES

CROSS-REFERENCE TO RELATED APPLICATIONS

The present application is based on and claims priority under 35 U.S.C. § 119 to Japanese Patent Application No. 2006-144051, filed on May 24, 2006, the entire contents of which are expressly incorporated by reference herein.

BACKGROUND OF THE INVENTION

1. Field of the Invention

The present invention relates to a charge control device for a battery used for cycle use.

2. Description of the Related Art

A conventional technique for controlling charge to a lead battery, which is used for an electric car or the like, is the charge method of JP 2006-114312. The method of JP 2006-114312 employs a constant current multi-stage charge system, and multiple stage charge steps (charge stages) are executed one after another in one charge operation revolution. A charge current amount charged into the lead battery is decided every charge step and is set to be lower as the charge step proceeds to the later stage. At each charge step, the battery is charged based upon a previously allotted charge current amount. The charge step is changed to another charge step of the next stage when a battery voltage reaches a preset voltage Vr.

On this occasion, at the initial charge step, a charge time of the final step is decided based upon a charge electricity quantity and a battery temperature at the particular step. Thus, at the final step, the charge is completed when the charge time elapses.

However, if the charge method described above is employed, a situation may occur where the charge step cannot be changed to the next charge step even when a long time elapses due to some deterioration condition of the battery. That is, because the condition is set in such a manner that the charge step is changed to the next step when the battery voltage reaches the preset voltage Vr, the battery voltage hardly reaches the preset voltage Vr that is the step change determining condition, particularly, at the later step(s) where the charge is executed with the charge current value being lower, if the battery has deteriorated. As a result, the battery is overcharged and the life of the battery can be shortened.

SUMMARY OF THE INVENTION

In view of the circumstances noted above, an aspect of at least one of the embodiments disclosed herein is to provide a charge control device for properly inhibiting overcharge or undercharge of a battery.

In accordance with one aspect of the invention, a charge control device including a charger for charging a battery, and executing a plurality of charge stages starting with an initial charge stage and ending with a final charge stage, one after another, in such a manner that a charge current value at each charge stage is set to be equal to or less than a charge current value of an immediately preceding charge stage is provided. The charge control device comprises a battery voltage detector arranged to detect a voltage of the battery, a battery temperature detector arranged to detect a temperature of the battery, a controller configured to set an upper time limit of each charge stage based at least in part on the battery temperature detected by the battery temperature detector, and a voltage determining circuit for determining whether the battery voltage detected by the battery voltage detector reaches a change voltage. The charge control device further comprises a controller for determining whether the upper time limit of each of the respective charge stages has elapsed by counting an elapsing time from a start moment of each charge stage to the upper time limit of each charge stage, and a stage change control module for changing the charge stage that precedes the final charge stage at least one turn to the final charge stage when the battery voltage has reached the change voltage or the upper time limit has elapsed.

In accordance with another embodiment, a charge control device including a charger for charging a battery, and executing a plurality of charge stages starting with an initial charge stage and ending with a final charge stage, one after another, in such a manner that a charge current value at each charge stage is set to be equal to or less than a charge current value of an immediately preceding charge stage, is provided. The charge control device comprises a voltage detecting means for detecting a voltage of the battery, a temperature detecting means for detecting a temperature of the battery, an upper time limit setting means for setting an upper time limit of each charge state based at least in part on the detected battery temperature, and a voltage determining means for determining whether the detected battery voltage reaches a change voltage. The charge control device further comprises a time-up determining means for determining whether the upper time limit of each of the charge states has elapsed by counting an elapsing time from a charge start time of each charge stage, and a stage change control means for changing the charge state that precedes the final charge stage at least one turn to the final charge stage when receiving either a voltage determining output indicating that the voltage determining means determines that the battery voltage has reached the change voltage and a time determining output indicating that the time-up determining means determines that the upper limit time has elapsed.

In accordance with still another aspect of the present invention, a method for charging a battery, and executing a plurality of charge states starting with an initial charge stage and ending with a final charge stage, one after another, in such a manner that a charge current value at each charge stage is set to be equal to or less than a charge current value of an immediately preceding charge stage, is provided. The method comprises detecting a voltage of the battery, detecting a temperature of the battery, setting an upper time limit of each charge stage based at least in part on the detected battery temperature, determining whether the detected battery voltage reaches a change voltage, determining whether the upper time limit of each of the respective charge stages has elapsed, and changing the charge stage that precedes the final stage by at least one turn to the final charge stage when the detected battery voltage has reached the change voltage or the upper time limit has elapsed.

BRIEF DESCRIPTION OF THE DRAWINGS

These and other features, aspects and advantages of the present inventions will now be described in connection with preferred embodiments, in reference to the accompanying drawings. The illustrated embodiments, however, are merely examples and are not intended to limit the inventions. The drawings include the following 17 figures.

FIG. 1 is a schematic side elevational view showing a golf cart which has a charge control device according to one embodiment.

FIG. 2 is a schematic system block diagram showing an outline of a control system of the golf cart.

FIG. 3 is a flowchart showing a charge control routine of a first embodiment.

FIG. 4 is a flowchart showing a second stage change determining routine in the charge control routine.

FIG. 5 is a flowchart showing a third stage change determining routine in the charge control routine.

FIG. 6 is an explanatory illustration showing a sample third stage upper time limit calculation table.

FIG. 7 is an explanatory illustration showing a sample fourth stage charge setting time calculation map.

FIG. 8 is a graph showing examples of transitions of charge current, battery temperature and a battery voltage.

FIG. 9 is a flowchart showing a charge control routine as a second embodiment.

FIG. 10 is an explanatory illustration showing a sample second stage upper time limit calculation table.

FIG. 11 is a graph showing examples of transitions of charge current, battery temperature and battery voltage in the second embodiment.

FIG. 12 is a flowchart showing a charge control routine as a third embodiment.

FIG. 13 is an explanatory illustration showing a sample first stage upper time limit calculation table.

FIG. 14 is a graph showing examples of transitions of charge current, battery temperature and battery voltage in the third embodiment.

FIG. 15 is a flowchart showing a charge control routine as a variation of the first embodiment.

FIG. 16 is a flowchart showing a charge control routine as a variation of the second embodiment.

FIG. 17 is a flowchart showing a charge control routine as a variation of the third embodiment.

DETAILED DESCRIPTION OF THE PREFERRED EMBODIMENT

In the following detailed description, terms of orientation such as "right," "left," "front," "rear," "frontward," and "rearward" are used herein to simplify the description of the context of the illustrated embodiments. Moreover, left, right, front and rear directions are described hereinbelow as directions as seen from a driver seated on a seat of a vehicle, such as a golf cart. Likewise, terms of sequence, such as "first" and "second," are used to simplify the description of the illustrated embodiments. Because other orientations and sequences are possible, however, the present invention should not be limited to the illustrated orientation. Those skilled in the art will appreciate that other orientations of the various components described above are possible.

FIGS. 1 and 2 show an electric vehicle having a charge control device according to one embodiment. In the illustrated embodiment, the electric vehicle is a golf cart 10. Additionally, the inventions disclosed herein are not limited to a golf carts, but are applicable to other types of four-wheel electric vehicles. Moreover, the inventions disclosed herein are not limited to four-wheel electric vehicles, but may be used with other types of electric vehicles.

The golf cart 10 has two front wheels FL, FR disposed on left and right sides of a body 11 in a front portion thereof and two rear wheels RL, RR disposed on the left and right portions of the body 11 in a rear portion thereof. A front seat 12a that can accommodate two persons and a rear seat 12b that can accommodate three persons are disposed in a central portion of the body 11 so as to be aligned in a fore to aft direction. A steering wheel 13 is disposed in front of the front seat 12a and in the front portion of the body 11.

A roof section 14 can be disposed in an upper portion of the body 11 to extend via support frames 14a placed at four corners of the body 11. A bumper 15a can be attached to a front end lower portion of the body 11, while another bumper 15b can be attached to a rear end lower portion of a cowling 11a forming the rear portion of the body 11. The golf cart 10 can operate in an automatic mode and a manual mode. When the manual operation mode is used, the driver sitting on the front seat 12a rotates the steering wheel 13 to change directions of the respective front wheels FL, FR rightward or leftward. The golf cart 10 thus changes its advance direction while turning right or left to run.

That is, the steering wheel 13 is fixed to a top end of a steering shaft 13a which extends upwardly with a slight rearward slant from a front lower portion of the body 11 and is rotatable about an axis thereof. A bottom end of the steering shaft 13a supporting the steering wheel 13 meshes with a rack bar 16 extending horizontally relative to a longitudinal direction of the golf cart 10. The rack bar 16 can move rightwardly or leftwardly (in an axial direction of the rack bar 16) with the rotation of the steering shaft 13a. The directions of the left and right front wheels FL, FR change with the movement of the rack bar 16. Also, the steering shaft 13a is formed with a lower section and an upper section, and a steering clutch 17 is positioned therebetween to connect or disconnect the lower section and the upper section.

When the upper section and the lower section of the steering shaft 13a are connected to each other by the steering clutch 17, the front wheels FL, FR are steered in response to the operation of the steering wheel 13 by the driver. When the upper section of the steering shaft 13a is disconnected from the lower section thereof by the steering clutch 17, the steering wheel 13 is fixed to stay at a specific position. Under this condition, the automatic drive mode is executed, and the lower section of the steering shaft 13a is rotated by an operation of a steering motor 18 placed in the lower section of the steering shaft 13a. In response to the rotation, the front wheels FL, FR change the directions thereof rightward or leftward.

An accelerator pedal 21 and a brake pedal 22 are disposed side by side in the front portion of the body 11 below the steering wheel 13. A drive motor 23, a transmission 24 for transmitting the power of the drive motor 23 to the rear wheels RL, RR and so forth are disposed in the rear portion of the body 11. The driver operates the accelerator pedal 21 and the brake pedal 22 to operate the golf cart 10. The accelerator pedal 22 is connected to a controller 50 through an accelerator potentiometer 21a. When the driver steps on the accelerator pedal 21, the accelerator potentiometer 21a detects a position of the accelerator pedal 21 (step-on quantity).

A detection value detected by the accelerator potentiometer 21a is transmitted to a running control section 51 provided in the controller 50 as an accelerator position signal. The running control section 51 can have a micro-computer. The running control section 51 drives the drive motor 23 through a drive circuit 52 based at least in part upon the accelerator position signal transmitted from the accelerator potentiometer 21a. The drive motor 23 rotates the rear wheels RL, RR through the transmission 24. Thereby, the golf cart 10 accelerates. If the golf cart 10 is operated in the automatic operation mode, the running control section 51 controls the drive motor 23 to drive the rear wheels RL, RR.

The brake pedal 22 is connected to respective disk brakes provided for the front wheels FL, FR and the rear wheels RL, RR, through a hydraulic disk brake system (not shown) and is also connected to the running control section 51 through a brake motor 22a. The brake pedal 22 can have a brake switch 22b for detecting that the brake pedal 22 is operated and a pressure sensor 22c for detecting a hydraulic pressure generated when the driver steps on the brake pedal 22.

Therefore, when the driver steps on the brake pedal 22, the amount of depression (e.g., step-on force) of the brake pedal 22 is transmitted to the disk-brakes of the respective front wheels FL, FR and rear wheels RL, RR through the hydraulic disk-brake system. The disk brakes thus operate to brake the rotation of the front wheels FL, FR and the rear wheels RL, RR. If the golf cart 10 is operated in the automatic operation mode, the running control section 51 controls the brake motor 22a to operate the disk brakes to brake at least one of the wheels FL, FR, RL, RR, in a manner corresponding to (e.g., proportional to) the amount the driver steps on the brake pedal 22. On this occasion, the brake switch 22b detects that the brake pedal 22 is operated when the driver steps on the brake pedal 22.

The golf cart 10 has a power switch 27 and a start/stop switch 28. The power switch 28 is pivotable between an ON position and an OFF position when a key is inserted and turned. The golf cart 10 is ready to run when the power switch 27 is turned to the ON position. The golf cart 10 is disabled for running when the power switch 27 is turned to the OFF position. The start/stop switch 28 is a switch for starting the golf cart 10 or for stopping it. An operational condition of the start/stop switch 28 is transmitted to the running control section 51 as a signal. When the start/stop switch 28 is actuated (e.g., pushed) under a condition that the power switch 28 is placed at the ON position, the golf cart 10 starts to run. When the start/stop switch is actuated again, the golf cart 10 stops.

The golf cart 10 can have a drive battery 30 and a control battery 31. The drive battery 30 supplies electric power to the drive motor 23 through the drive circuit 52 of the controller 50. In one embodiment, the drive battery 30 can be formed with six sealed lead battery cells whose rating output voltage is 12V, connected in series with each other. Accordingly, in one embodiment the drive battery 30 can supply 72V power to the drive circuit 52. The drive battery 30 can have a temperature sensor 33 placed on a top surface of a casing thereof to detect a battery temperature. The temperature sensor 33 outputs a signal corresponding to a temperature of the drive battery 30.

The control battery 31 can be a multipurpose vehicle use battery whose rating is, for example, 12V and supplies electric power to the controller 50 and various electrical loads in the golf cart 10.

The golf cart 10 has a charger 40 that can be used to charge at least one of the drive battery 30 and the control battery 31. The charger 40 can include a 72V charge circuit 41 for charging the drive battery 30 and a 12V charge circuit 42 for charging the control battery 31. The charger 40 can have a plug socket (not shown). When a plug 43p of a charge cable 43 is connected to the plug socket, AC200V commercial use power is obtained to charge the drive battery 30 and the control battery 31.

The controller 50 has a charge control section 53 for controlling a charge operation of the charger 40 and a memory 54. The charge control section 53 has a micro-computer which can execute charge control processes, described further below. The memory 54 can include a ROM(s) to store control programs executed by the running control section 51 and by the charge control section 53, as well as various control data, and a RAM(s), an EEPROM(s) and so forth to temporarily store data.

The charge control section 53 can include a voltage detecting circuit 53a that detects a terminal voltage Vx of the drive battery 30 (battery voltage Vx) by converting the terminal voltage Vx to a digital signal, for example, through an A/D converter, and a temperature detecting circuit 53b that detects a battery temperature Tb by converting an analog signal provided from the temperature sensor 33 to a digital signal through an A/D converter. The charge control section 53 is connected to the charger 40 through a communication interface 53c and outputs a control command to the charger in accordance with a charge control program which will be described later.

Next, the charge control processes that can be executed by the charge control section 53 will be described.

Because the charge processes of the drive battery 30 and the charge processes of the control battery 31 are similar, the charge control processes of the drive battery 30 will are described below.

FIG. 3 is a flowchart showing one embodiment of a charge control routine, which can be stored in the memory 54 as a control program.

The control routine starts when the plug 43p of the charge cable 43 is connected to the charger 40 and a charge switch (not shown) is turned on.

Additionally, although every control process is assigned with a step number following the symbol S, the step numbers and the charge stage numbers are independent of each other.

Upon starting the control routine, a charge process of a first stage is started (S10). In the charge process of the first stage, a charge current can be set to 9 A to charge the drive battery 30. The charge control section 53 can control the 72V charge circuit 41 of the charger 40 so that 9 A of constant current flows to the drive battery 30. Additionally, a timer is started and synchronized with the start of the first stage to count an elapsing time t1x of the first stage. This timer can be configured with a software timer of the micro-computer.

When the charge process of the first stage is started, as shown in FIG. 8, a battery voltage Vb (charge voltage) gradually rises.

During this charge period, it is repeatedly determined whether a change condition to a second stage has been achieved or not (S11). In the charge control routine in this embodiment, four charge stages are executed one after another. At this moment, a change in time to the second stage from the first stage is determined. Specifically, it is determined along the flowchart of FIG. 4.

That is, it is determined whether the elapsing time t1x from the moment of the start of the charge process of the first stage has reached a preset upper time limit t1o or not (S111). If the elapsing time t1x is within the upper time limit t1o, it is determined whether the battery voltage Vx has reached a preset voltage Vo (hereunder, called "change voltage Vo") or not (S12).

As shown in FIG. 8, the battery voltage Vx is low at the moment of the charge start and then rises while the charge time elapses. If the battery voltage Vx reaches the change voltage Vo before the upper time limit t1o elapses from the start of the first stage (S112: YES), the change condition (transfer condition) to the second stage is achieved at this moment (S113). Unless the battery voltage Vx has reached the change voltage Vo within the upper time limit t1o (S112: NO), at the moment where the upper time limit t1o has elapsed (S111: YES), the change condition to the second stage is achieved (S113).

Because the charge current is set to be lower as the charge step proceeds in the constant current multi-stage charge system, a high charge current flows at the first stage. Therefore, normally, the battery voltage Vx reaches the change voltage Vo before the upper time limit t1o elapses. In this embodiment, the charge current value and the change voltage value are set so that the battery is charged 80% at the first stage.

Additionally, both of the battery voltage Vx and the elapsing time t1x are determined in the first embodiment. The process at the step S111, however, can be omitted and the change condition to the second stage can be set only by the determination of the battery voltage Vx at the step S112.

When, as thus described, it is determined that the change condition to the second stage has been achieved (S11: YES), the charge time t1x at the first stage is stored (S12) into the memory 54. Because the battery 30 is charged with each preset constant current at the respective charge stage, a product of this constant current value and the charge time t1x at the first stage corresponds to a charge electricity quantity charged into the drive battery 30. The product will be used in a calculating process for deciding a charge time at a fourth stage described later.

A signal from the temperature sensor 33 is read to detect the battery temperature Tb, which can be is stored in the memory 54 (S13). The battery temperature Tb obtained at the end of the first stage is used together with the charge time t1x in the calculating process for deciding the charge time at the fourth stage described later.

The charge process of the second stage is started next (S14). In the charge process of the second stage, a charge current can be set to be 5 A to charge the drive battery 30. The charge control section 53 can control the 72V charge circuit 41 of the charger 40 so that constant current of 5 A flows to the drive battery 30. The timer is reset and synchronized with the start of the second stage to count an elapsing time t2x of the second stage.

Continuing, it is determined whether a change condition to a third stage has been achieved or not (S15). The determination whether the change condition achieves or not is executed along the flowchart shown in FIG. 5.

That is, similarly to the determination of the change condition to the second stage made at step S11 above, it is determined whether the elapsing time t2x from the moment of the start of the charge process of the second stage has reached a preset upper time limit t2o or not (S151). If the elapsing time t2x is within the upper time limit t2o, it is determined whether the battery voltage Vx has reached the preset voltage Vo or not (S152).

If the battery voltage Vx reaches the change voltage Vo before the upper time limit t2o elapses from the start of the second stage (S152: YES), the change condition (transfer condition) to the third stage is achieved at this moment (S153). Unless the battery voltage Vx has reached the change voltage Vo within the upper time limit t2o (S152: NO), at the moment where the upper time limit t2o has elapsed (S151: YES), the change condition to the third stage is achieved (S153).

Additionally, both of the battery voltage Vx and the elapsing time t2x are determined in the first embodiment. The process at the step S151, however, can be omitted and the change condition to the second stage can be set only by the determination of the battery voltage Vx at the step S152.

When, as thus described, it is determined that the change condition to the third stage has been achieved (S15: YES), a signal from the temperature sensor 33 is read to detect the battery temperature Tb.

Continuing, the program goes to a step S17 to calculate an upper time limit t3o of the third stage that is set in response to the battery temperature Tb at the end of the second stage. In this calculation, a calculation table shown in FIG. 6 can be referenced. In this example, the upper time limit t3o can be set to be two hours if the battery temperature Tb is equal to or lower than 5° C., and to be 1.5 hours if it is equal to or higher than 15° C. The upper time limit t3o can also be set in a linear manner, as shown in FIG. 6, if the battery temperature Tb is in a range between 5° C. and 15° C., to be between two hours and 1.5 hours, and the higher the battery temperature Tb, the shorter the time.

Additionally, in one embodiment the setting of the upper time limit t3o relative to the battery temperature Tb requires that the upper time limit t3o at a high temperature is shorter than that at a low temperature. The upper time limit t3o thus can be set at will.

Continuing, the charge process of the third stage is started (S18). In the charge process of the third stage, a charge current can be set to be 1.5 A to charge the drive battery 30. The charge control section 53 can control the 72V charge circuit 41 of the charger 40 so that 1.5 A of constant current flows to the drive battery 30. The timer is reset and synchronized with the start of the third stage to count an elapsing time t3x of the third stage.

Next, in order to determine the achievement of a change condition to a fourth stage from the third stage, determination processes of steps S19 and a step S20 are executed. At step S19, it is determined whether the elapsing time t3x from the start of the charge process of the third stage has reached a preset upper time limit t3o or not. If the elapsing time t3x is within the upper time limit t3o, it is determined, at the step 20, whether the battery voltage Vx has reached the preset voltage Vo or not.

When the battery voltage Vx reaches the change voltage Vo, or when the upper time limit t3o elapses before the battery voltage Vx reaches the change voltage Vo (e.g., because the rise of the battery voltage is slow), the charge stage is changed to the fourth stage. Processes which will be executed at later steps vary in accordance with the achieved voltage charge of the change conditions.

That is, in the situation wherein the battery voltage Vx reaches the change voltage Vo within the upper time limit t3o (S20: YES), a value of a complete charge mode cycle B is set to be "5" (S22). Meanwhile, in the situation wherein the upper time limit t3o elapses before the battery voltage Vx reaches the change voltage Vo (S19: YES), the value of the complete charge mode cycle B is set to be "10" (S21).

The complete charge mode cycle will be described here.

In the fourth stage, which is the final charge stage in the illustrated embodiment, the charge setting time is calculated based upon the charge electricity quantity supplied to the drive battery 30 at the first stage and the battery temperature Tb. FIG. 7 indicates a calculation map for calculating the charge setting time of the fourth stage. The horizontal axis represents the battery temperature Tb at the end of the first stage, while the vertical axis represents the charge electricity quantity (ampere*minute) supplied to the drive battery 30 in the first stage. In this embodiment, the charge electricity quantity at the first stage is 9 A*t1x.

As shown in this map, the charge setting time of the fourth stage is set from the combination of the charge time t1x and the battery temperature Tb of the first charge stage.

The charge electricity quantity of the first stage represents a discharge level of the drive battery 30 before being charged. A total charge electricity quantity charged to the drive battery 30 is set in accordance with the discharge level; thereby, the drive battery 30 is charged so that a proper charge rate is provided. Therefore, in this embodiment, the charge time of the fourth stage is set by the map shown in FIG. 7 so that the charge electricity quantity corresponding to the discharge level is provided. In this connection, the charge rate varies in response to the battery temperature. Thus, the lower the battery temperature Tb is, the longer the charge time of the fourth stage is set.

Also, the charge setting time at the fourth stage varies in accordance with a charge mode. In the numerical values appearing in the map, the numerical values at the upper positions indicate charge setting times in a normal mode, while the numerical values in the parenthesis at the lower positions indicate charge setting times in a complete charge mode. For example, if the battery temperature Tb is 30° C. and the first stage charge time t1$x$ is 100 minutes, the charge setting time at the fourth stage is 0.5 hour in the normal mode and is 2.5 hours in the complete charge mode.

Generally, it is desired to make the charge of 105%-125% relative to the discharge quantity. If the charge is lower than 100%, a sudden battery capacity decline can e experienced. Meanwhile, if the charge is over 125%, early deterioration of the battery may occur due to the overcharge.

Therefore, in this embodiment, when the drive battery 30 is normal, the time in the normal mode is set so that the charge of 105% relative to the discharge quantity is made, and the time in the complete charge mode is set so that the charge of 125% relative to the discharge quantity is made. Thus, the charge setting time in the complete charge mode is set to be longer than that in the normal mode. This complete charge mode corresponds to the long mode.

The complete charge mode cycle represents a cycle in which the charge is made in the complete charge mode. For example, if the value of the complete charge mode cycle B is set to be "5" (B=5), the complete charge mode is set once per five times and the normal mode is set for the remainder four times.

Generally, the golf cart 10 is used after the battery is charged everyday. Under such a use condition, the charge is made in the complete charge mode once every five days and is made in the normal mode in the remainder four days.

With continued reference to FIG. 3, during the charge of the third stage at the step S18, if the battery voltage Vx reaches the change voltage Vo within the upper time limit t3$o$ (S20: YES), it is considered that the drive battery 30 has not yet deteriorated. Under this condition, the value of the complete charge mode cycle B is set to be "5" (S22).

Meanwhile, if the charge time reaches the upper time limit t3$o$ before the battery voltage Vx reaches the change voltage Vo (S19: YES), it is considered that the drive battery 30 has deteriorated. Under this condition, the value of the complete charge mode cycle B is set to be "10" (S21).

That is, if the deterioration of the drive battery 30 is not detected, the complete charge mode is set once per five times, and if the deterioration of the drive battery 30 is detected, the complete charge mode is set once per ten times.

With the complete charge mode cycle B set as described above, a value Cx of a counter which counts charge revolutions is continuously read in and it is determined whether the counter value Cx is equal to the complete charge mode cycle B or not (step S23). This counter value Cx increases by an increment of one at the end of every charge at step S31, which will be described later, and is stored in the memory 54. Accordingly, at step 23, the count value Cx is read out from the memory 54, and it is determined whether the count value Cx is equal to the complete charge mode cycle value B set at the preceding step (S21 or step S22) or not.

If the counter value Cx is equal to the complete charge mode cycle value B (Cx=B), the charge mode is set to be the complete charge mode (S24). Otherwise, the charge mode is set to be the normal mode (S25). Also, if the complete charge mode is set, the counter value Cx is reset to "0" (S26).

Upon the completion of the mode setting as thus described, the charge setting time t4$o$ of the fourth stage is calculated (S27). The charge setting time t4$o$ corresponding to the charge mode is calculated, as described above, based upon the calculation map of FIG. 7.

Continuing, the charge process of the fourth stage is started (S28). In the charge process at the fourth stage, the charge current can be set to be 1.5 A (as shown in FIG. 8) to charge the drive battery 30. The charge control section 53 can control the 72V charge circuit 41 of the charger 40 so that a constant current of 1.5 A flows to the drive battery 30. The timer is reset and synchronized with the start of the fourth stage to count the elapsing time t4$x$ at the fourth stage.

During charging, the elapsing time t4$x$ is continuously monitored. When the elapsing time t4$x$ reaches the charge setting time t4$o$ (S29: YES), the charge process at the fourth stage ends (S30). On this occasion, a charge completion lamp or the like (not shown) is operated to notify the user of the charge completion.

Continuing with FIG. 3, the count value Cx of the counter is increased (S31) by an increment of "1". Accordingly, if the charge process of this time is the complete charge mode, the counter value Cx is set to be value "1." Otherwise, if the charge process is the normal mode, the counter value Cx is increased by an increment of "1".

Accordingly, the counter value Cx used at the step S23 is the value that represents how many revolutions of the charges are executed from the complete charge mode in the previous revolution. For example, if the complete charge mode cycle value is set to be "5," the complete charge mode is set whenever the counter value Cx is equal to "5," i.e., once per five times. Therefore, by setting the value of B, the cycle of the complete charge mode can be adjusted.

When the process of the step S31 completes as thus described, the charge control routine ends.

According to the charge control routine in the first embodiment, because the charge stage is changed to the later charge stage based upon the battery voltage and the upper time limit, the charge stage can proceed to the final fourth stage regardless of any deterioration conditions of the drive battery 30. Also, because the charge current value is lower as the charge stage proceeds to the later stage, the rise of the battery voltage is hardly obtained if the battery has deteriorated. However, regarding the change to the fourth stage (final stage) from the third stage, because the upper time limit t3$o$ of the third stage is set in response to the battery temperature Tb, the upper time limit can be an optimum time limit which is provided also in view of the charge efficiency. That is, the upper time limit t3$o$ at a low temperature where the charge efficiency is relatively low, in comparison with a high temperature where the charge efficiency is relatively high, can be set high. As a result, charge efficiency changes in response to the battery temperature can be decreased and the overcharging or undercharging of the drive battery 30 can be inhibited.

Additionally, an upper time limit setting means does not need to set the upper time limits of all the charge stages and can instead set the upper time limit of the charge stage that precedes the final charge stage at least one turn. Also, a time-up determining means does not need to determine the charge times of all the charge stages and can instead determine the time of the charge stage that precedes the final charge stage at least one turn.

Therefore, regarding the charge stage(s) starting with the initial charge stage and ending with the charge stage that precedes the final charge stage n turns (n: natural number which can be given as n>1), means for changing the charge stage to the next charge stage based upon, for example, the voltage determining output of the voltage determining means, or the voltage determining output and the preset upper time limit elapsing can be provided.

Also, regarding the final charge stage, the charge end time thereof can be set at will. Otherwise, for example, means for setting the charge time based upon the charge electricity quantity and the battery temperature, both obtained at the initial charge stage, can be provided.

The value of the complete charge mode cycle B is varied in accordance with the step change achieving condition provided when the charge stage is changed to the fourth stage from the third stage. Thus, the overcharging of the drive battery 30 can be inhibited to avoid the early deterioration of the battery. That is, if the charge time reaches the upper time limit t3o before the battery voltage Vx reaches the change voltage Vo, the deterioration degree of the drive battery 30 is high and the charge time is longer. The frequency of the long mode charge execution is decreased to inhibit the overcharge.

For example, if a case in which the charge process is started when the counter value Cx stored in the memory 54 is "5" is considered, the charge is executed in the complete charge mode unless the drive battery 30 has deteriorated (S20→S22→S23→S24).

However, if the drive battery 30 has deteriorated and the charge time reaches the upper time limit t3o before the battery voltage Vx reaches the change voltage Vo, the value of the complete charge mode cycle B is varied to "10" before the mode setting process is executed. The complete charge mode thus is canceled (S19→S21→S23→S25). Unless the deterioration condition of the drive battery 30 is changed, the complete charge mode is set further in the charge time at the fifth revolution.

Additionally, if the condition of the drive battery 30 is recovered after the complete charge mode is canceled, the counter value Cx is undesirably larger than the complete charge mode cycle B (for example, Cx=7, B=5). On this occasion, however, the counter value Cx is preferably cleared to be "0."

The proper charge rate of the drive battery 30 in this embodiment relative to the discharge quantity is 105%-125%. Therefore, if the charge is lower than 100%, a sudden battery capacity decline is invited. Meanwhile, if the charge is over 125%, the early deterioration of the battery occurs by the overcharge. Therefore, in this charge control routine, when the drive battery 30 is normal, the charge current value, the change voltage Vo and the fourth stage charge time t4o are set so that the charge in which the charge rate is 105% is executed in the normal mode and the charge in which the charge rate is 125% is executed in the complete charge mode.

Thus, when the complete charge mode cycle B is set to be "5," an average charge rate becomes 109% by the execution of the complete charge mode once per five times (105*4+125)/5=109). Accordingly, a proper charge rate can be maintained.

On the other hand, if the drive battery has deteriorated and the charge time reaches the upper time limit t3o before the battery voltage Vx reaches the change voltage Vo, the charge time becomes longer and the charge rate becomes larger. For example, the charge rate rises to 122% in the normal mode and rises to 135% in the complete charge mode. However, by the charge mode cycle B being changed to "10," the average charge rate can be suppressed to be 123.3% ((122*9+135)/10)=123.3).

On the contrary, if a case in which the upper time limit t3o is not changed in response to the battery temperature Tb, but is fixed, and the value of the complete charge mode cycle B is also fixed is considered, the average charge rate cannot be maintained in a proper range if the drive battery has deteriorated. In an example wherein the upper time limit is set to be a fixed value that is longer than one provided as reference, the charge rate rises, for example, to 140% in the normal mode and to 160% in the complete charge mode. In the construction wherein the value of the complete charge mode cycle B is fixed to "5," the average charge rate reaches 144% ((130*4+160)/5=144) and the early deterioration of the battery is invited.

Because the charge setting time t4o at the fourth stage is set using the charge electricity quantity (9 A*t1x), the battery temperature Tb and the charge mode of the first stage, the charge setting time t4o is set in an accurate manner. That is, the discharge level of the drive battery 30 before being charged is estimated by the charge electricity quantity at the first stage and the charge time of the fourth stage is decided so that a proper charge electricity quantity corresponding to the discharge level is supplied. The charge time of the fourth stage is adjusted as shown in the map of FIG. 7 in response to the battery temperature Tb, which affects the charge rate. Thus, the proper charge that is 105%-125% relative to the discharge quantity can be executed. As a result, the sudden capacity decline due to the lack of the charge and the early deterioration of the battery due to overcharging can be inhibited.

Therefore, the golf cart 10, which runs using the drive battery 30 that is properly charged, can operate longer. Also, the life of the battery can be increased, and battery maintenance (e.g., battery exchange) can be reduced.

Next, a charge control process according to a second embodiment will be described. FIG. 9 is a flowchart showing a charge control routine stored in the memory 54 as a control program.

The charge control routine of this second embodiment is a routine in which the change conditions to the third stage executed at the steps S14-S15 of the charge control routine of the first embodiment are modified and the other processes remain the same. Accordingly, hereunder, only processes which are different from those in the first embodiment will be described.

In the charge control routine of the second embodiment, the charge time t1x and the battery temperature Tb are stored after the first stage has completed (S12, S13). Continuing, the upper time limit t2o of the second stage that is set in response to the battery temperature Tb is calculated (S41). In this calculation, a calculation table shown in FIG. 10 can be referenced. In the illustrated example, the upper time limit t2o is set to be 1.5 hours if the battery temperature Tb is equal to or lower than 5° C., to be 1.0 hour if it is equal to or higher than 15° C. The upper time limit t2o is also set, if the battery temperature Tb is in the range between 5° C. and 15° C., to be between 1.5 hours and 1.0 hour, and the higher the battery temperature Tb, the shorter the time.

Continuing, the charge process of the second stage is started (S42). The charge process of the second stage is the same as the step S14 in the first embodiment, and the charge current can be set to be 5 A to charge the drive battery 30. Also, the timer is reset and synchronized with the start of the second stage to count an elapsing time t2x of the second stage.

Next, in order to determine the achievement of the change condition to the third stage from the second stage, steps S43 and a step S44 are executed. At step S43, it is determined whether the elapsing time t2x from the start of the charge process of the second stage has reached the preset upper time limit t2o or not. If the elapsing time t2x is within the upper time limit t2o, it is determined whether the battery voltage Vx has reached the preset voltage Vo or not (step S44).

These determinations are repeated during charging of the drive battery 30. If the battery voltage Vx reaches the change voltage Vo within the upper time limit t2o (S44: YES), the program can go to step S16 (see FIG. 3) without doing anything. If, however, the charge time reaches the upper time limit t2o before the battery voltage Vx reaches the change voltage Vo (S43: YES), the value of the complete charge mode cycle B is set to "20" (S45). Then, the program proceeds to step S16. Processes from the step S16 on are the same as those of the first embodiment.

In the illustrated embodiment, because the charge current is set to be 5 A at the second stage, it is highly likely that the battery voltage Vx can easily rise. If, however, the battery has greatly deteriorated, as indicated by the dashed line of FIG. 11, there can be a situation in which the battery voltage Vx does not reach the change voltage Vo within the upper time limit t2o.

Therefore, in this second embodiment, the upper time limit t2o of the second stage is set in response to the battery temperature Tb provided at the end of the first stage. The overcharging or undercharging of the drive battery 30 can thus be inhibited.

In addition, because the battery voltage Vx not only at the second stage but also at the third stage does not reach the change voltage Vo in this situation, the charge time increases and the change rate becomes larger than that in the normal mode. Therefore, in this second embodiment, the frequency of the complete charge mode execution is decreased to inhibit overcharging the drive battery 30.

Additionally, in the second embodiment, the value of the complete charge mode cycle B is calculated at step S45 at the end of the second stage and at steps S21 and S22 at the end of the third stage. The maximum value Bmax calculated in these steps is the value B that is finally compared with the counter value Cx (S23: Cx=Bmax?). For example, in a situation where the value of the complete charge mode cycle B is set to "20" at step S45, even though value "10" is set at the step S21, the value "20" which is the maximum value is employed.

Next, a charge control process according to a third embodiment will be described. FIG. 12 is a flowchart showing a charge control routine of the third embodiment that can be stored in the memory 54 as a control program.

The charge control routine of the third embodiment is a routine in which the change conditions from the first stage to the second stage executed at the steps S10-S11 of the charge control routine of the second embodiment are modified and the other processes are the same. Accordingly, hereunder, only processes which are different from those in the second embodiment will be described.

In the charge control routine of the third embodiment, the upper time limit t1o at the first stage is variable in response to the battery temperature Tb at the start of the charge of the first stage.

That is, at the start of this control routine, the signal from the temperature sensor 33 is read to detect the battery temperature Tb (S51), and the upper time limit t1o of the first stage calculated in response to the battery temperature Tb (S52). In this calculation, a calculation table shown in FIG. 13 can be referenced. In the illustrated example, the upper time limit t1o is set to be five hours if the battery temperature Tb is equal to or lower than 5° C., and to be three hours if it is equal to or higher than 15° C. The upper time limit t1o is also set, if the battery temperature Tb is in the range between 5° C. and 15° C., to be between five hours and three hours, and the higher the battery temperature Tb, the shorter the time.

Continuing, the charge process of the first stage is started (S53). The charge process of the first stage is the same as the step S10 in the first embodiment, and the charge current can be set to be 9 A to charge the drive battery 30. Also, the timer is reset and synchronized with the start of the first stage to count an elapsing time t1x of the first stage.

Next, in order to determine the achievement of the change condition to the second stage from the first stage, determination processes of steps S54 and a step S55 are executed. At step S54, it is determined whether the elapsing time t1x from the start of the charge process of the first stage has reached the preset upper time limit t1o or not. If the elapsing time t1x is within the upper time limit t1o, it is then determined whether the battery voltage Vx has reached the preset voltage Vo or not (step S55).

These determinations are repeated during charging of the drive battery 30. If the battery voltage Vx reaches the change voltage Vo within the upper time limit t1o (S55: YES), the program can go to step S12 without doing anything. If, however, the charge time reaches the upper time limit t1o before the battery voltage Vx reaches the change voltage Vo (S54: YES), the value of the complete charge mode cycle B is set to "30" (S56). Then, the program proceeds to step S12. Processes from the step S12 onward are the same as those of the second embodiment.

In the illustrated embodiment, because the charge current is set to be 9 A at the first stage, it is highly likely that the battery voltage Vx can easily rise. If, however, the battery has greatly deteriorated, as indicated by the dashed line of FIG. 14, there can be a situation in which the battery voltage Vx does not reach the change voltage Vo within the upper time limit t1o.

Therefore, in this third embodiment, the upper time limit t1o of the first stage is set in response to the battery temperature Tb provided at the start of the charge. The overcharging or undercharging of the drive battery 30 in the second stage thus can be inhibited in such a situation.

In addition, because the battery voltage Vx not only at the first stage but also at the second stage and at the third stage does not reach the change voltage Vo in this situation, the charge time increases and the change rate becomes larger than in the normal mode. Therefore, in this third embodiment, the frequency of the complete charge mode execution is decreased to inhibit the overcharging of the drive battery 30.

Additionally, also in the third embodiment, the value of the complete charge mode cycle B is set multiple times (S56, S45, S21, S22). The maximum value Bmax set in these steps is employed as the value B that is finally compared with the counter value Cx (S23: Cx=Bmax?).

Next, variations in the three embodiments described above will be described.

In the three embodiments described above, the upper time limit tno (N=1, 2, 3) of the (n) stage is calculated based upon the battery temperature Tb at the end of the previous or (n−1) stage. In another embodiment, the battery temperature Tb is repeatedly detected during charging at the particular stage to renew the upper time limit tno using the latest battery temperature detection value Tb.

For example, in a variation of the first embodiment, as shown in FIG. 15, the battery temperature Tb is repeatedly detected during charging at the third stage and the upper time limit t3o is calculated each time based upon the latest detection value to be renewed (S16-S20).

During charging of the drive battery 30, the battery temperature Tb gradually increases. Accordingly, together with the increase, the upper time limit t3o gradually decreases. Thereby, the illustrated embodiment achieves an optimum setting of the upper time limit t3o. The proper charge rate thus can be obtained even though the battery has deteriorated.

Similarly, in a variation of the second embodiment, as shown in FIG. 16, in the repeated processes of steps S40-S44, the upper time t2o is repeatedly renewed based upon the battery temperature Tb.

Likewise, in a variation of the third embodiment, as shown in FIG. 17, in the repeated processes of steps S51-S55, the upper time t1o is repeatedly renewed based upon the battery temperature Tb.

In addition to the three embodiments described above, and the respective variations thereto, various modifications can be made and fall within the scope of the present inventions.

For example, at least one embodiment above discloses a charge control device for charging the drive battery of the golf cart. However, the embodiments above can be applied to vehicles other than a golf cart. Also, the numerical values indicated in the embodiments (the battery voltage value, the charge current value, the charge stage number, the upper time limit, the charge rate, etc.) can be set to values other than the values illustrated in the embodiments above. Another type of device in which the charge mode is not varied is also practicable.

Additionally, the structure formed with at least the charge control section 53, the memory 54, the temperature sensor 33 and the charger 40 corresponds to the charge control device. The voltage detecting circuit 53a in the embodiments corresponds to the battery voltage detecting means. The temperature sensor 33 and the temperature detecting circuit 53b of the embodiments correspond to the battery temperature detecting means. The processes of the steps S17, S41 and S52 of the charge control routine executed by the charge control section 53 of the embodiments correspond to the upper time setting means. The processes of the steps S20, S44 and S55 of the charge control routine executed by the charge control section 53 of the embodiments correspond to the voltage determining means. The processes of the steps S19, S43 and S54 of the charge control routine executed by the charge control section 53 of the embodiments correspond to the time-up means. The processes of the steps S18-S20 of the charge control routine executed by the charge control section 53 of the embodiments correspond to the stage change control means.

Also, the processes of the steps S24-S25 of the charge control routine executed by the charge control section 53 of the embodiments correspond to the charge mode changing means. The charge mode change means changes the charge mode to the long mode when the long mode is selected to set the final charge stage longer than a normal period.

The process of the step S31 of the charge control routine executed by the charge control section 53 of the embodiments corresponds to the charge revolution counting means. The charge revolution counting means count the charge operation revolutions of the battery 30, and the charge mode selecting means select the long mode every preset charge revolutions based upon the counted values. Therefore, by periodically setting the charge time of the final charge stage to be longer, the complete charge of the battery 30 can be made to supplement the lack of charge. By properly selecting the cycle in which the long mode charge is executed, the overcharge of the battery 30 can be inhibited on average and a reduction in the life of the battery 30 can be avoided. The processes of the steps S23-S25 of the charge control routine executed by the charge control section 53 of the embodiments correspond to the charge mode selecting means.

Further, the processes of the steps S21, S22, S45 and S56 of the charge control routine executed by the charge control section 53 of the embodiments correspond to the mode cycle varying means. The process of the step S27 of the charge control routine executed by the charge control section 53 of the embodiments corresponds to the final charge stage time determining means.

The cycle in which the long mode charge is selected, i.e., the cycle of the long mode charge executed every preset charge revolutions is varied in accordance with a stage change achieving condition provided when the charge stage is changed to the final stage.

If the deterioration degree of the battery 30 is high, there can be a state in which the charge time reaches the upper time limit without the battery voltage reaching the change voltage. In such a state, the charge rate is high because the charge time of the battery 30 is long. Hence, in a situation where the battery 30 has deteriorated, the frequency of the long mode charge execution is decreased so that the average charge rate is maintained in a proper range to inhibit the deterioration of the battery 30 from overcharging.

A stage change control means makes the change from the charge stage that precedes the final charge stage [n] turns to the next charge stage in the respective charge stages when the battery voltage reaches the change voltage, or when the upper time limit elapses. The earlier the charge stage is, the larger the charge current value is set, when the constant current multi-stage charge is executed. Thus, intrinsically, the battery voltage easily rises. If, however, the degree of deterioration of the battery voltage is large, the proper rise of the battery voltage may not be obtained even in the earlier stage(s). In this situation, the earlier the charge stage (i.e., the smaller the number n of the n stage) is, the longer the charge time which includes the charge time of the later charge stage is. The charge rate thus increases.

Therefore, when the charge stage is changed to the next charge stage because the charge time reaches the upper time limit without the battery voltage reaching the change voltage, the earlier the charge stage is, the longer the cycle in which the long mode is selected is set. That is, the larger the degree of deterioration of the battery is, the smaller the frequency of the long mode charge execution is. Accordingly, the average charge rate can be maintained in the proper range to inhibit the deterioration of the battery 30 due to overcharging.

If the battery 30 has deteriorated, the charge stage is changed to the next charge stage by the time-up determination. In this situation, the setting of the upper time limit affects the charge rate. Although the upper time limit can be set in response to the battery temperature, the upper time limit is set in consideration of the battery temperature during the charge time. That is, the battery temperature gradually increases during the charging of the battery 30, and the upper time limit is renewed one after another together with the increase so that the optimum upper time limit can be set and the charge rate can be a proper charge rate.

Although these inventions have been disclosed in the context of a certain preferred embodiments and examples, it will be understood by those skilled in the art that the present inventions extend beyond the specifically disclosed embodiments to other alternative embodiments and/or uses of the inventions and obvious modifications and equivalents thereof. In addition, while a number of variations of the inventions have been shown and described in detail, other modifications, which are within the scope of the inventions, will be readily apparent to those of skill in the art based upon this disclosure. It is also contemplated that various combinations or subcombinations of the specific features and aspects of the embodiments may be made and still fall within one or more of the inventions. Accordingly, it should be understood that various features and aspects of the disclosed embodiments can be combine with or substituted for one another in order to form varying modes of the disclosed inventions. Thus, it is intended that the scope of the present inventions herein disclosed should not be limited by the particular disclosed embodiments described above.

What is claimed is:

1. A charge control device including a charger for charging a battery, and executing a plurality of charge stages starting with an initial charge stage and ending with a final charge stage, one after another, in such a manner that a charge current value at each charge stage is set to be equal to or less than a charge current value of an immediately preceding charge stage, comprising:
   a battery voltage detector arranged to detect a voltage of the battery;
   a battery temperature detector arranged to detect a temperature of the battery;
   a controller configured to set an upper time limit of each charge stage based at least in part on the battery temperature detected by the battery temperature detector;
   a voltage determining circuit for determining whether the battery voltage detected by the battery voltage detector reaches a change voltage;
   a controller for determining whether the upper time limit of each of the respective charge stages has elapsed by counting an elapsing time from a start moment of each charge stage to the upper time limit of each charge stage; and
   a stage change control module configured to change the charge stage that precedes the final charge stage at least one turn to the final charge stage when the battery voltage has reached the change voltage or the upper time limit has elapsed.

2. The charge control device according to claim 1, further comprising:
   a charge mode changing module configured to change the final charge stage between a normal mode in which a charge time is short and a long mode in which the charge time is long;
   a charge revolution counting module configured to count charge operation revolutions, wherein a charge operation executed at the charge stages starting with the initial charge stage and ending with the final charge stage is to be one charge operation revolution; and
   a charge mode selecting module configured to select the long mode every preset charge revolutions and selecting the normal mode at the other charge revolutions to command the charge mode change module to change to the selected charge mode.

3. The charge control device according to claim 2, further comprising a mode cycle varying module configured to vary a cycle in which the long mode is selected so that the cycles are different between a state in which the charge stage is changed to the final charge stage when the upper time limit has elapsed before the battery voltage has reached the change voltage and another state in which the charge stage is changed to the final charge stage when the battery voltage has reached the change voltage before the upper time limit has elapsed.

4. The charge control device according to claim 3, wherein the mode cycle varying module sets the cycle in which the long mode is selected to be longer in the state in which the charge stage is changed to the final charge stage when the upper time limit has elapsed before the battery voltage has reached the change voltage, in comparison with the state in which the charge stage is changed to the final charge stage when the battery voltage has reached the change voltage before the upper time limit has elapsed.

5. The charge control device according to claim 4, wherein the stage change control module is configured to make the change from the charge stage that precedes the final charge stage by n turns to the next charge stage in the respective charge stages until the final charge state when receiving the voltage determining output indicating that the battery voltage has reached the change voltage, or the time determining output indicating that upper time limit has elapsed, and
   the mode cycle varying module, in the state in which the charge stage is changed to the final charge stage when the upper time limit has elapsed before the battery voltage has reached the change voltage, is configured to set the cycle in which the long mode is selected to be longer as the charge stage at which the reaching of the upper time limit is made earlier.

6. The charge control device according to claim 5, further comprising a final charge stage time determining module configured to determine the charge time at the final charge stage using at least one of a charge electricity quantity at the initial charge stage, the temperature of the battery detected by the battery temperature detector and the charge mode selected by the charge mode selecting module.

7. The charge control device according to claim 6, wherein the battery temperature detector repeatedly detects the temperature of the battery during the charge stages, and
   an upper time limit setting module successively renews the upper time limit in response to the detected temperature of the battery.

8. The charge control device according to claim 7, wherein the charge control device is applied for charging the battery that provides at least a power source for operating an electric motor of an electric vehicle.

9. A charge control device including a charger for charging a battery, and executing a plurality of charge stages starting with an initial charge stage and ending with a final charge stage, one after another, in such a manner that a charge current value at each charge stage is set to be equal to or less than a charge current value of an immediately preceding charge stage, comprising:
   a voltage detecting means for detecting a voltage of the battery;
   a temperature detecting means for detecting a temperature of the battery;
   an upper time limit setting means for setting an upper time limit of each charge state based at least in part on the detected battery temperature;
   a voltage determining means for determining whether the detected battery voltage reaches a change voltage;
   a time-up determining means for determining whether the upper time limit of each of the charge states has elapsed by counting an elapsing time from a charge start time of each charge stage; and
   a stage change control means for changing the charge state that precedes the final charge stage at least one turn to the final charge stage when receiving either a voltage determining output indicating that the voltage determining means determines that the battery voltage has reached the change voltage and a time determining output indicating that the time-up determining means determines that the upper limit time has elapsed.

10. The charge control device according to claim 9, further comprising:
   a charge mode changing means for changing the final charge stage between a normal mode in which a charge time is short and a long mode in which the charge time is long;

a charge revolution counting means for counting charge operation revolutions, wherein a charge operation executed at the charge stages starting with the initial charge stage and ending with the final charge stage is to be one charge operation revolution; and a charge mode selecting means for selecting the long mode every preset charge revolutions and selecting the normal mode at the other charge revolutions to command the charge mode change means to change to the selected charge mode.

11. The charge control device according to claim 10, further comprising a mode cycle varying means for varying a cycle in which the long mode is selected so that the cycles are different between a state in which the charge stage is changed to the final charge stage when the upper time limit has elapsed before the battery voltage has reached the change voltage and another state in which the charge stage is changed to the final charge stage when the battery voltage has reached the change voltage before the upper time limit has elapsed.

12. The charge control device according to claim 11, wherein the mode cycle varying means sets the cycle in which the long mode is selected to be longer in the state in which the charge stage is changed to the final charge stage when the time-up determining means determines that the upper time limit has elapsed before the voltage determining means determines that the battery voltage has reached the change voltage, in comparison with the state in which the charge stage is changed to the final charge stage when the voltage determining means determines that the battery voltage has reached the change voltage before the time-up determining means determines that the upper time limit has elapsed.

13. The charge control device according to claim 12, wherein the stage change control means makes the change from the charge stage that precedes the final charge stage by n turns to the next charge stage in the respective charge stages until the final charge state when receiving the voltage determining output indicating that the voltage determining means determines that the battery voltage has reached the change voltage, or the time determining output indicating that the time-up determining means determines that the upper time limit has elapsed, and the mode cycle varying means, in the state in which the charge stage is changed to the final charge stage when the time-up determining means determines that the upper time limit has elapsed before the voltage determining means determines that the battery voltage has reached the change voltage, sets the cycle in which the long mode is selected to be longer as the charge stage at which the reaching of the upper time limit is made earlier.

14. The charge control device according to claim 13, further comprising a final charge stage time determining means for determining the charge time at the final charge stage using at least one of a charge electricity quantity at the initial charge stage, the temperature of the battery detected by the battery temperature detector and the charge mode selected by the charge mode selecting means.

15. The charge control device according to claim 14, wherein the battery temperature detecting means repeatedly detects the temperature of the battery during the charge stages, and the upper time limit setting means successively renews the upper time limit in response to the detected temperature of the battery.

16. A method for charging a battery, and executing a plurality of charge states starting with an initial charge stage and ending with a final charge stage, one after another, in such a manner that a charge current value at each charge stage is set to be equal to or less than a charge current value of an immediately preceding charge stage, comprising:

detecting a voltage of the battery;

detecting a temperature of the battery;

setting an upper time limit of each charge stage based at least in part on the detected battery temperature;

determining whether the detected battery voltage reaches a change voltage;

determining whether the upper time limit of each of the respective charge stages has elapsed; and changing the charge stage that precedes the final stage by at least one turn to the final charge stage when the detected battery voltage has reached the change voltage or the upper time limit has elapsed.

17. The method of claim 16, further comprising:

changing the final charge stage between a normal mode in which a charge time is short and a long mode in which the charge time is long;

counting charge operation revolutions, wherein a charge operation starts with the initial charge stage and ends with the final charge stage; and selecting the long mode every preset number of charge revolutions and selecting the normal mode at other charge revolutions.

18. The method of claim 17, further comprising varying a cycle in which the long mode is selected so that the cycles are different between a state in which the charge stage is changed to the final stage when the upper time limit has elapsed before the battery voltage has reached the change voltage and another state in which the charge stage is changed to the final charge stage when the battery voltage has reached the change voltage before the upper time limit has elapsed.

19. The method of claim 17, wherein detecting the temperature of the battery comprises repeatedly detecting the temperature of the battery during each charge stage, and setting an upper time limit of each charge stage comprises successively renewing the upper time limit in response to the detected temperature of the battery.

* * * * *

UNITED STATES PATENT AND TRADEMARK OFFICE
CERTIFICATE OF CORRECTION

PATENT NO. : 7,525,290 B2  Page 1 of 1
APPLICATION NO. : 11/753410
DATED : April 28, 2009
INVENTOR(S) : Shouichirou Miyata It is certified that error appears in the above-identified patent and that said Letters Patent is hereby corrected as shown below:

At Column 2, line 24, please delete "state", and insert --stage--, therefor.

At Column 2, line 29, please delete "states", and insert --stages--, therefor.

At Column 2, line 32, please delete "state", and insert --stage--, therefor.

At Column 2, line 37, please delete "limit time", and insert --time limit--, therefor.

At Column 6, line 51, please delete "(S12).", and insert --(S112).--, therefor.

At Column 18, line 51, please delete "states", and insert --stages--, therefor.

At Column 18, line 61, please delete "limit time", and insert --time limit--, therefor.

At Column 19, line 36, please delete "state", and insert --stage--, therefor.

At Column 20, line 12, please delete "states", and insert --stages--, therefor.

Signed and Sealed this

Eighth Day of December, 2009

David J. Kappos
*Director of the United States Patent and Trademark Office*